United States Patent
Wang et al.

(10) Patent No.: US 10,877,924 B2
(45) Date of Patent: Dec. 29, 2020

(54) INSTRUCTION SET PROCESSING METHOD BASED ON A CHIP ARCHITECTURE AND APPARATUS, AND STORAGE MEDIUM

(71) Applicant: TENCENT TECHNOLOGY (SHENZHEN) COMPANY LIMITED, Shenzhen (CN)

(72) Inventors: Yuwei Wang, Shenzhen (CN); Xiaoyu Yu, Shenzhen (CN); Lixin Zhang, Shenzhen (CN); Bo Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/865,239

(22) Filed: May 1, 2020

(65) Prior Publication Data

US 2020/0257652 A1   Aug. 13, 2020

Related U.S. Application Data

(63) Continuation of application No. PCT/CN2018/119732, filed on Dec. 7, 2018.

(30) Foreign Application Priority Data

Jan. 16, 2018   (CN) .......................... 2018 1 0041814

(51) Int. Cl.
G06F 8/41       (2018.01)
G06F 15/78      (2006.01)
G06N 20/00      (2019.01)

(52) U.S. Cl.
CPC ......... *G06F 15/7807* (2013.01); *G06N 20/00* (2019.01)

(58) Field of Classification Search
None
See application file for complete search history.

(56) References Cited

U.S. PATENT DOCUMENTS 5,717,834 A * 2/1998 Werblin ................. G06N 3/063
                                                            706/16
9,235,812 B2 * 1/2016 Scholtes ................. G06N 5/02
(Continued)

FOREIGN PATENT DOCUMENTS

CN   104025042 A   9/2014
CN   106022472 A   10/2016
CN   107563512 A   1/2018

OTHER PUBLICATIONS

The World Intellectual Property Organization (WIPO) International Search Report for PCT/CN2018/119732 dated Mar. 8, 2019 6 Pages (including translation).

(Continued)

*Primary Examiner* — Cheng Yuan Tseng
(74) *Attorney, Agent, or Firm* — Anova Law Group, PLLC

(57) ABSTRACT

Embodiments of this application disclose an instruction set processing method based on a chip architecture and apparatus, and a computer-readable storage medium. The method includes compiling a deep learning model based on the architecture of the chip, to obtain a deep learning instruction set corresponding to the chip; compressing the deep learning instruction set, to obtain a compressed instruction set; and storing the compressed instruction set in an instruction set buffer of the chip by writing in a register, the compressed instructions executing a task.

20 Claims, 7 Drawing Sheets

| Operation code 1 | Operand information |
| Operation code 2 | Operand information |
| Operation code 3 | Operand information |
| Operation code 4 | Operand information |

| Operation code 5 | Operand information |
| Operation code 2 | Operand information |
| Operation code 3 | Operand information |
| Operation code 6 | Operand information |

| Operation code 1 | Operand information |
| Operation code 2 | Operand information |
| Operation code 3 | Operand information |
| Operation code 4 | Operand information |
| Operation code 5 | Operand information |
| Operation code 6 | Operand information |

(56) References Cited

U.S. PATENT DOCUMENTS

| | | | | |
|---|---|---|---|---|
| 10,157,045 B2* | 12/2018 | Venkataramani | ..... | G06N 3/0454 |
| 10,229,356 B1* | 3/2019 | Liu | ........................ | G06N 3/084 |
| 10,268,795 B2* | 4/2019 | Chuang | ................. | G06F 30/394 |
| 10,303,823 B2* | 5/2019 | Huang | .................... | H01L 25/50 |
| 10,310,821 B2* | 6/2019 | Brown | ...................... | G06F 8/35 |
| 10,621,486 B2* | 4/2020 | Yao | ....................... | G06F 7/5443 |
| 10,664,766 B2* | 5/2020 | Hammond | ................ | G06F 8/31 |
| 2010/0287359 A1 | 11/2010 | Norden | | |
| 2014/0082334 A1 | 3/2014 | King et al. | | |
| 2018/0046903 A1* | 2/2018 | Yao | ........................ | G06N 3/082 |
| 2018/0247190 A1* | 8/2018 | Chung | .................. | G06N 3/063 |
| 2018/0300600 A1* | 10/2018 | Ma | ......................... | G06N 3/063 |
| 2018/0373975 A1* | 12/2018 | Yu | ............................ | G06N 3/04 |
| 2019/0095796 A1* | 3/2019 | Chen | ...................... | G06N 3/084 |

OTHER PUBLICATIONS

Shaolin Liu et al., "Cambricon: An Instruction Set Architecture for Neural Networks", 2016 ACM/IEEE 43rd Annual International Symposium on Computer Architecture, Jun. 2016, pp. 393-405 13 Pages.

* cited by examiner

INSTRUCTION SET PROCESSING METHOD BASED ON A CHIP ARCHITECTURE AND APPARATUS, AND STORAGE MEDIUM

RELATED APPLICATIONS

This application claims priority to PCT Application No. PCT/CN2018/119732, filed on Dec. 7, 2018, which claims priority to Chinese Patent Application No. 201810041814.8, entitled "INSTRUCTION SET PROCESSING METHOD BASED ON A CHIP ARCHITECTURE AND APPARATUS, AND STORAGE MEDIUM" filed on Jan. 16, 2018, which are incorporated by reference in their entirety.

FIELD OF THE TECHNOLOGY

This application relates to the field of data processing technologies, and in particular, to an instruction set processing method based on a chip architecture and apparatus, and a storage medium.

BACKGROUND OF THE DISCLOSURE

With development of deep learning and data center architecture, the deep learning network is widely used in image classification and detection. Various deep learning models have also emerged. However, the complex network structure, the large quantity of parameters, and the long calculation time impose limitations on applications of the deep learning models. Therefore, model compression and model acceleration have become a research direction in the field of deep learning. One of the most important research topics is to identify an efficient processing mechanism for a deep learning instruction set.

In the related art, the deep learning model is compiled into an instruction set mainly by a compiler, and then functional modules of a chip are driven by directly using the instruction set, to execute tasks corresponding to instructions.

Because the functional modules of the chip are driven by directly using the instruction set, to execute the tasks corresponding to instructions, the instructions are frequently retrieved and accessed, resulting in high overhead. Particularly, for a complex model, an instruction set occupies a large storage space.

SUMMARY

Embodiments of this application provide an instruction set processing method based on a chip architecture and apparatus, and a computer-readable storage medium, to resolve the technical problems existing in the related art, and the technical solutions are as follows.

According to one aspect, an instruction set processing method based on a chip architecture is provided. The method includes compiling a deep learning model based on the architecture of the chip, to obtain a deep learning instruction set corresponding to the chip; compressing the deep learning instruction set, to obtain a compressed instruction set; and storing the compressed instruction set in an instruction set buffer of the chip by writing in a register, the compressed instructions executing a task.

According to another aspect of the present disclosure, an instruction set processing apparatus is further provided. The apparatus includes a memory and a processor coupled to the memory. The processor is configured to compile a deep learning model based on an architecture of a chip, to obtain a deep learning instruction set matching the chip; compress the deep learning instruction set, to obtain a compressed instruction set; and store the compressed instruction set into an instruction set buffer of the chip by writing in a register, to execute a corresponding task.

According to another aspect of the present disclosure, a non-transitory computer readable storage medium is provided. The storage medium stores computer instructions that, when being executed by a processor, cause the processor to perform: compiling a deep learning model based on the architecture of the chip, to obtain a deep learning instruction set corresponding to the chip; compressing the deep learning instruction set, to obtain a compressed instruction set; and storing the compressed instruction set in an instruction set buffer of the chip by writing in a register, the compressed instructions executing a task.

According to another aspect of the present disclosure, an instruction set processing method based on a chip architecture is provided. The method includes receiving a task processing request; obtaining a compressed instruction set from an instruction set buffer of a chip according to the task processing request; decoding the compressed instruction set to obtain decoded instruction information; performing a register update operation of a register according to the decoded instruction information; and controlling, according to the register update operation, a corresponding functional module to execute a task corresponding to the instruction information.

According to another aspect of the present disclosure, an instruction set processing apparatus is provided. The apparatus includes a first receiving module, configured to receiving a task processing request; a second obtaining module, configured to obtain a compressed instruction set from an instruction set buffer according to the task processing request; an instruction set decoding module, configured to decode the compressed instruction set, to obtain decoded instruction information; a register update module, configured to perform a register update operation of a register according to the decoded instruction information; and a process control module, configured to control, according to the register update operation, a corresponding functional module to execute a task corresponding to the instruction information.

By compressing the to-be-processed deep learning instruction set, demands for storage space can be reduced. In addition, the compressed instruction set is stored in the instruction set buffer of the chip by writing in a register, and the instruction is registered, so that after the compressed instruction set is decoded to obtain the instruction information, the task is executed by using the instruction information, thereby reducing a quantity of instruction retrievals and accesses and the related overhead.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes the implementations of this application in detail with reference to the accompanying drawings. When the following descriptions are made with reference to the accompanying drawings, unless indicated otherwise, same numbers in different accompanying drawings represent same or similar elements. The following implementations described in the following exemplary embodiments do not represent all implementations that are consistent with this application.

With continuous development of deep learning and the data center architecture, chips such as an FPGA/an application-specific integrated circuit (ASIC), as a heterogeneous acceleration solution, are gradually brought into Internet data centers. Due to advantageous features in aspects such as computing capacity, response delay, and reconstruct-ability, the FPGA/ASIC is widely used in deep learning model acceleration. In addition, an artificial intelligence (AI) algorithm represented by deep learning is still in a rapid development stage. A conventional acceleration method based on model customization cannot adapt to fast iteration of the algorithm. Therefore, it is necessary to design a versatile acceleration solution of a chip-based (for example, FPGA/ASIC) deep learning model.

However, in addition to the versatility, many factors need to be considered for acceleration of chips such as an FPGA/ASIC. A very important factor is an efficient processing mechanism of a deep learning instruction set. Therefore, the embodiments of this application provide an efficient instruction set processing method based on a chip architecture for application of chips, such as an FPGA/ASIC, in the field of deep learning model acceleration. Compared with the related art, the method can be implemented to support acceleration of different models with less resources.

Figure 1:
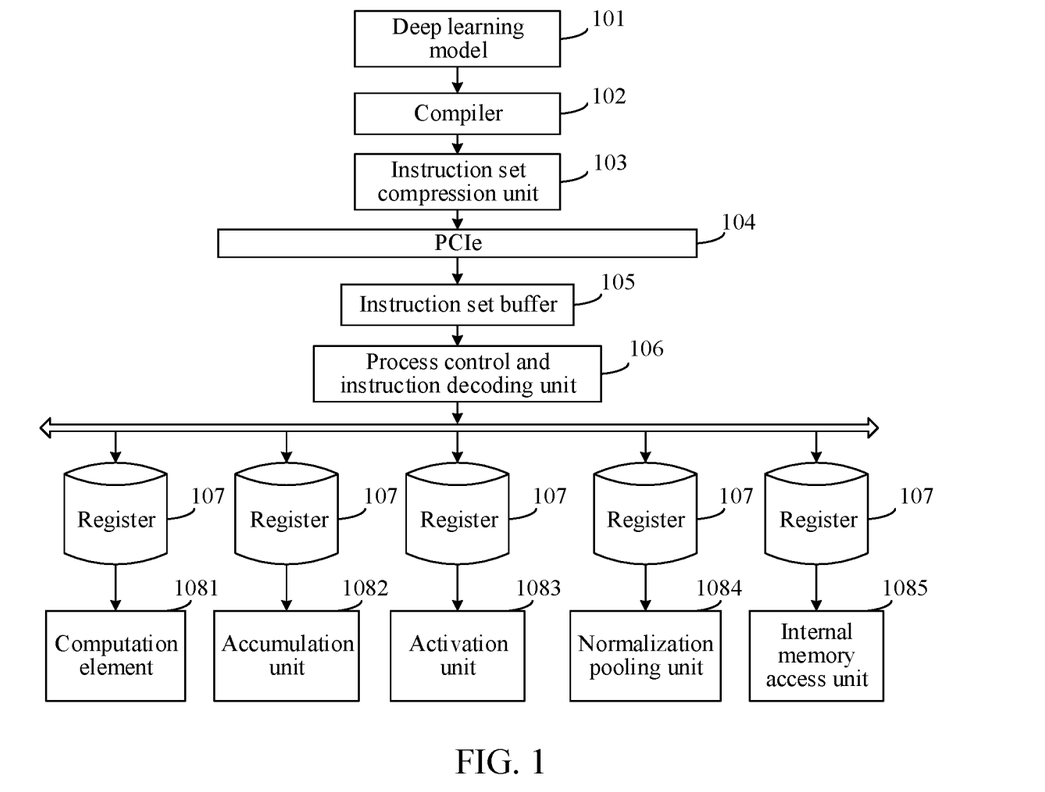
FIG. 1 is a schematic diagram of an instruction set processing system architecture according to an exemplary embodiment of this application.

The instruction set processing method based on a chip architecture provided in the embodiments of this application may be applied to a system architecture as shown in FIG. 1. The system architecture may be disposed in a device such as a terminal or a server. As shown in FIG. 1, the system architecture includes a deep learning model 101, a compiler 102, an instruction set compression unit 103, a PCIe 104, an instruction set buffer 105, a process control and instruction decoding unit 106, a register 107, and a functional module.

The deep learning model 101 is a to-be-accelerated deep learning model. The deep learning model 101 is configured to discover a distribution characteristic of data, and is usually used in applications such as a classification application and a detection application. The deep learning model 101 may select, for example, a convolutional neural network (CNN) model, a deep neural network (DNN) model, or a recurrent neural network (RNN) model, according to an application scenario.

The compiler 102 is configured to map the deep learning model 101 to an instruction set, that is, compile the deep learning model 101, to obtain a to-be-processed deep learning instruction set.

The instruction set compression unit 103 is configured to compress the to-be-processed deep learning instruction set and deliver the compressed instruction set to the instruction set buffer 105 by the PCIe 104.

The PCIe 104 is a high-speed computer extension serial bus, configured to transmit the instruction set.

The instruction set buffer 105 is configured to buffer the instruction set.

The process control and instruction decoding unit 106 is configured to, when a new task is detected, obtain an instruction from the instruction set buffer 105 and decode the instruction, and after obtaining instruction information, perform process control on the register 107 and the functional module according to the instruction information.

The register 107 and the functional module may be considered as a model accelerator, that is, a chip accelerator. The register 107 and the functional module have a one-to-one correspondence. Different registers 107 are configured to register operand information in the instruction information, and the operand information is used for indicating a source of data required for execution of the instruction.

The functional module is configured to, under control of the process control and instruction decoding unit 106, execute a corresponding function according to the operand information registered in the register 107 corresponding to the functional module.

As shown in FIG. 1, there may be one or more functional modules, and different functional modules may be set according to a processing manner required by the instruction. For example, the functional module includes, but is not limited to, a basic computation element (PE) 1081, an accumulation unit 1082, an activation unit 1083, a normalization and pooling unit 1084, and an internal memory access unit 1085.

Figure 2:
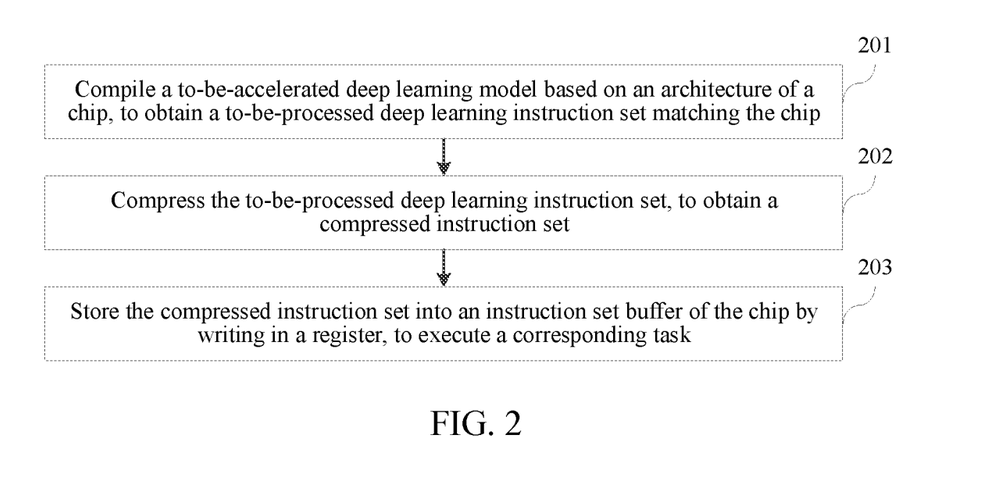
FIG. 2 is a flowchart of an instruction set processing method based on a chip architecture according to an exemplary embodiment of this application.

Then, with reference to the system architecture shown in FIG. 1, using an FPGA chip as an example, an instruction set processing method based on a chip architecture according to an embodiment of this application is explained and described. As shown in FIG. 2, the method includes the following steps.

Step 201. Compile a to-be-accelerated deep learning model based on an architecture of a chip, to obtain a to-be-processed deep learning instruction set matching the chip.

In one embodiment, step 201 may include step 1 to step 3 as follows.

Step 1. Select a matched deep learning model according to an application scenario.

The application scenario includes, but is not limited to, image classification, speech recognition, and intelligent recommendation. Because different models have respective advantages in different scenarios, the matched deep learning model may be selected according to the application scenario. For example, in an application scenario of image classification or image processing, a CNN model may be selected, and in an application scenario of speech recognition, a DNN model or an RNN model may be selected.

Certainly, in addition to selecting the deep learning model according to the application scenario, a configuration portal may be further provided. A set deep learning model is obtained by using the configuration portal, and the set deep learning model is used as the selected deep learning model. For example, a configuration portal is provided, after an instruction indicating that the configuration portal is selected is detected, a configuration interface is displayed, and optional deep learning models are provided on the configuration interface. A deep learning model selection instruction is obtained, and a deep learning model indicated by the selection instruction is used as the selected deep learning model.

In an example in which the optional deep learning models provided on the configuration interface are respectively a CNN model, a DNN model, and an RNN model, if the CNN model is selected and the deep learning model selection instruction indicating that the CNN model is obtained, the CNN model is used as the selected deep learning model.

Step 2. Train the selected deep learning model, to obtain a to-be-accelerated deep learning model.

After the selected deep learning model is determined, accuracy of model calculation may be improved by training the selected deep learning model. During training, mainstream frameworks, such as convolutional architecture for fast feature embedding (Caffe) and TensorFlow, may be selected to transmit a complex data structure into an artificial intelligence neural network for analysis and processing, thereby obtaining the to-be-accelerated deep learning model. Caffe is a clear and efficient deep learning framework. TensorFlow supports distributed calculation of heterogeneous devices, can automatically run a model on various platforms, and may be used in a plurality of deep machine learning fields of speech recognition or image recognition. A specific framework for training a model may be selected according to actual situations, and is not limited in this embodiment of this application.

Step 3. Perform, based on an architecture of a chip, structural analysis on the to-be-accelerated deep learning model and compile the to-be-accelerated deep learning model according to an analysis result, to obtain the to-be-processed deep learning instruction set matching the chip.

When the structural analysis is performed on the obtained to-be-accelerated deep learning model based on the architecture of the chip, in this embodiment of this application, analysis is performed aiming at higher calculation efficiency of multiply and accumulate (MAC) digital signal processing (DSP) and less internal memory access demands, mainly including several parts, namely, data dependency analysis, model structure optimization, and variable-precision fixed-point analysis. Implementations of the parts are as follows:

(1) Data Dependency Analysis

Streamlined calculation and parallelizable calculation in the deep learning model are analyzed and explored based on the architecture of the chip. The streamlined calculation may improve utilization of a computation element in a model accelerator, and the parallelizable calculation may use as many computation elements as possible at the same time.

Using an FPGA chip as an example, for the streamlined calculation, an analysis part includes an operation of loading data from a double data rate (DDR) internal memory to the FPGA chip and a streamline of computation performed by the PE. Through this optimization, times of internal memory access are overlapped. The DSP computes a computation control procedure of a whole column, to ensure improvement of DSP utilization.

For the parallelizable calculation, parallel relationships between a PE computation array and functional modules, such as an activation functional module, a pooling functional module, and a normalization functional module, need to be mainly analyzed, and how to determine data dependency and prevent conflicts is a key to the design herein.

(2) Model Structure Optimization

Two aspects are mainly involved: seeking model structure optimization and fixed-point analysis supporting dynamic precision adjustment.

The FPGA is a device that supports a large quantity of parallel calculations, and seeking higher-dimensional parallelism in terms of the model structure is significant for improving calculation efficiency and reducing the internal memory access. For example, in an deep learning model, if completely consistent data is inputted on first 1*1 convolution layers in different branches, and strides (step sizes of convolution kernels) and pads (extended edges) of the convolution layers both are consistent, outputted feature maps may be dimensionally aligned for superposition. After the superposition, memory accessing demands for the inputted data are reduced to ⅓ of the original demands. That is, demands for accessing the internal memory are reduced, and calculation efficiency is increased.

On the other hand, for the method provided in this embodiment of this application, the Int16 solution for fixed-point analysis supporting dynamic precision adjustment may be used. Int16 is an identifier defined by an integer data type, and represents a signed integer whose value is between −32768 and +32767. Through such a method, the trained model may be directly deployed by using the compiler almost without any loss of precision.

Based on the foregoing analysis, bandwidth is always one of the bottlenecks restricting performance in a computer architecture, internal memory access directly affects power efficiency of an accelerator. This embodiment of this application provides an internal memory architecture shown in FIG. 3, to reduce DDR internal memory access to a largest extent during model calculation: performing ping-pong design for an input buffer and an output buffer, and maximizing streamlined and parallel processing capabilities; supporting an inner-copy operation between the input buffer and the output buffer; and supporting a cross-copy operation between the input buffer and the output buffer.

Figure 3:
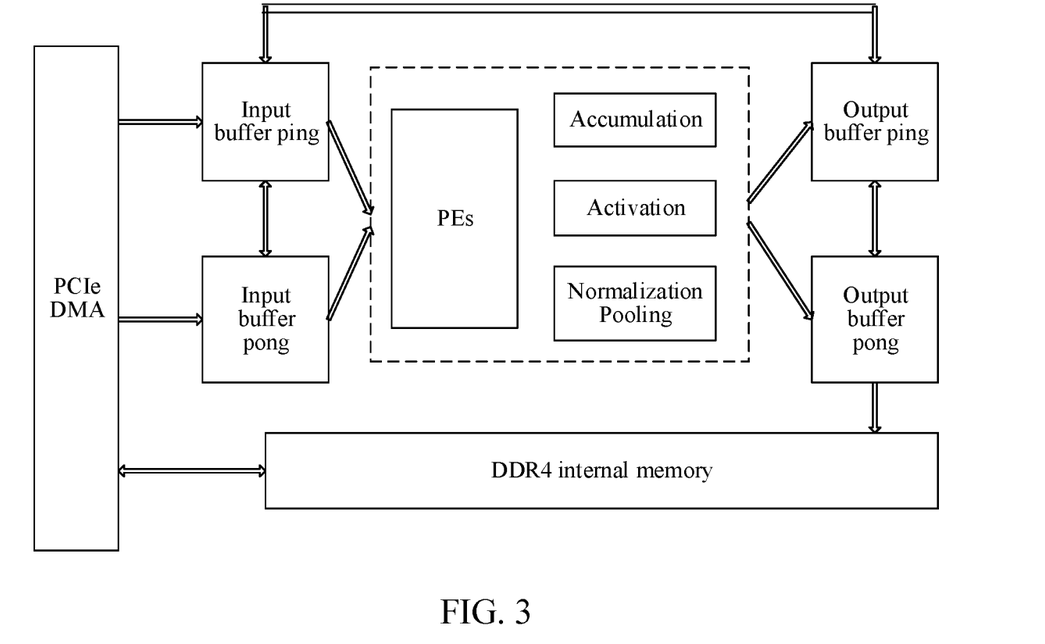
FIG. 3 is a schematic architectural diagram of an internal memory according to an exemplary embodiment of this application.

Existing internal memory access does not support the inner-copy operation and the cross-copy operation between the input buffer and the output buffer. Therefore, after a data processing request enters the input buffer from a PCIe DMA, then is processed by a functional module, and is output to the output buffer, the data processing request needs to be written into a DDR4 internal memory. The DDR4 internal memory is an off-chip internal memory. An access rate is low when the DDR4 internal memory is accessed again.

In this embodiment, by using the foregoing internal memory architecture, during internal memory access, because the inner-copy operation and the cross-copy operation between the input buffer and the output buffer are supported, after the data processing request enters the input buffer from the PCIe DMA, then is processed by the functional module, and is output to the output buffer, if data needs to be used subsequently, the data may not be written into the DDR4 internal memory, and instead, is returned to the input buffer. The input buffer and the output buffer are in-chip buffers, and therefore, compared with off-chip access to the DDR4 internal memory, not only increases an access rate, but also reduces power consumption.

Based on the foregoing analysis, for most of the current mainstream deep learning models, the accelerator can buffer all intermediate data on the FPGA chip. Except for loading a model weight, no operation that consumes additional internal memory is needed. A feature map of an intermediate layer cannot be completely stored in a model on the FPGA chip, and according to this embodiment of this application, a concept of a slice shard is introduced to a channel dimension. Therefore, a concept of a part shard is introduced to a feature map dimension. A primary convolution or a pooling/normalization operation is properly split by using the compiler, a DDR memory access operation and FPGA acceleration calculation are performed as a streamlined operation, to reduce demands for DDR memory access as much as possible while preferentially ensuring efficiency of DSP calculation.

Accordingly, through the foregoing analysis on data dependency and parallel relationships in the calculation process, a complete deep learning model is split, according to parameter information of each layer of the deep learning model, into smaller computation elements that may be supported by the chip. The to-be-accelerated deep learning model is compiled according to the foregoing analysis and splitting processes, to obtain the to-be-processed deep learning instruction set matching the chip.

The to-be-processed deep learning instruction set matching the chip may be a coarse-grained instruction set that is selected according to a processing capability of each functional module in the chip accelerator. Therefore, a quantity of instruction sets after model mapping is reduced, and less storage space is used, thereby further reducing overheads of instruction retrievals and accesses.

In addition, for a specific task, after being fully trained, deployed online, and run, a model remains unchanged for a period of time. Therefore, the instruction set corresponding to the deep learning model may be fully loaded during initialization of the chip accelerator without being delivered for each workload, thereby greatly reducing instruction chip-based instruction set processing.

Step 202. Compress the to-be-processed deep learning instruction set, to obtain a compressed instruction set.

Based on step 201, for a versatile deep learning accelerator, the deep learning model is decomposed into small executable units and executed in hardware. Using execution of a large matrix multiplication as an example, assuming that the deep learning accelerator needs to be split and executed n times to complete calculations, each calculation needs to be completed by using k instructions. Instruction content includes information such as length, width, and height dimensions of a matrix, a source address of the matrix, a destination address of the matrix, and whether the matrix needs to be fully accumulated. Normally, n*k instructions are needed to complete the large matrix multiplication. However, for deep learning, that is, an application scenario with high calculation density, many of the instruction sets of the split task are the same, that is, there is space to be compressed.

Therefore, after the to-be-processed deep learning instruction set is obtained, according to this embodiment of this application, the to-be-processed deep learning instruction set is compressed to reduce overheads of subsequent instruction retrievals and accesses. The compression may include, but is not limited to, any of the following:

A first compression method: same content compression.

Figure 4:
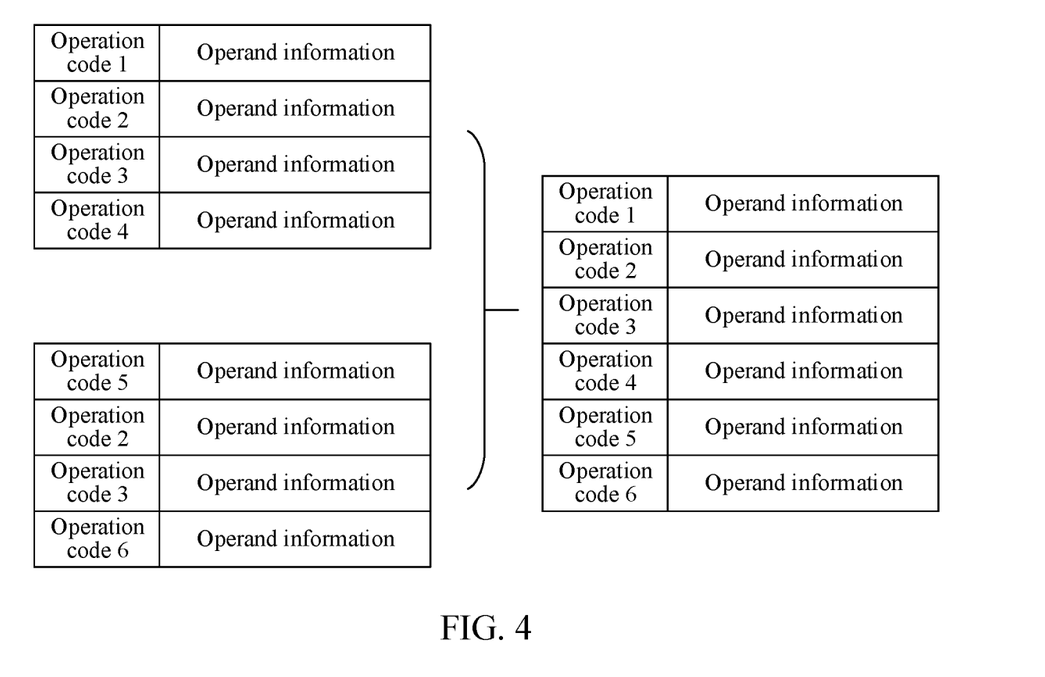
FIG. 4 is a schematic diagram of compression of a deep learning instruction set according to an exemplary embodiment of this application.

Considering that each instruction in the to-be-processed deep learning instruction set includes an operation code (opcode) and operand information, therefore, when the to-be-processed deep learning instruction set is compressed, instructions having the same opcode in the to-be-processed deep learning instruction set are compressed, to obtain a compressed instruction set. For example, FIG. 4 is a schematic diagram of compression of a deep learning instruction set.

A second compression method: compression based on a bit width.

In this method, a bit width of each instruction in the to-be-processed deep learning instruction set may be obtained, and instructions having bit widths less than a reference value are combined, to obtain a compressed instruction set.

The reference value may be set according to an actual situation. Using configuration, the reference value to 32 bits as an example, after the bit width of each instruction is obtained, instructions of which the content is less than 32 bits are combined. For example, a bit width of an instruction indicating a kernel size is 5 bits, a bit width of an instruction indicating a feature map size is 26 bits, and the two instructions may be combined, to obtain a compressed instruction.

Certainly, in addition to the foregoing compression methods, other compression methods may be used, and the compression method is not limited in this embodiment of this application.

Step 203. Store the compressed instruction set into an instruction set buffer of the chip by writing in a register, to execute a corresponding task.

Regardless of which method is used for compression, the compressed instruction set may be a register array with a specific bit width (for example, 32 bits). These compressed instruction sets are written to the instruction set buffer by writing in a register through the PCIe. The instruction set buffer may be formed by a BRAM, and a BRAM resource of the chip needs to be occupied to implement the process. However, because the instruction set is compressed, and the used BRAM resources are less than those in a case in which the instruction set is not compressed, less resources are used, leading to positive significance for product development.

In addition, after the compressed instruction set is stored in the instruction set buffer of the chip, in the method provided in this embodiment of this application, the corresponding task may alternatively be executed by using the compressed instruction set. For a task execution process, reference may be made to a method process shown in FIG. 5, and details are not described herein.

According to the method provided in this embodiment of this application, the to-be-processed deep learning instruction set is compressed, and demands for storage space can be reduced. In addition, the compressed instruction set is stored in the instruction set buffer of the chip by writing in a register, and the instruction is registered, thereby reducing a quantity of instruction retrievals and accesses and reducing overheads of the retrievals and accesses during task execution.

Figure 5:
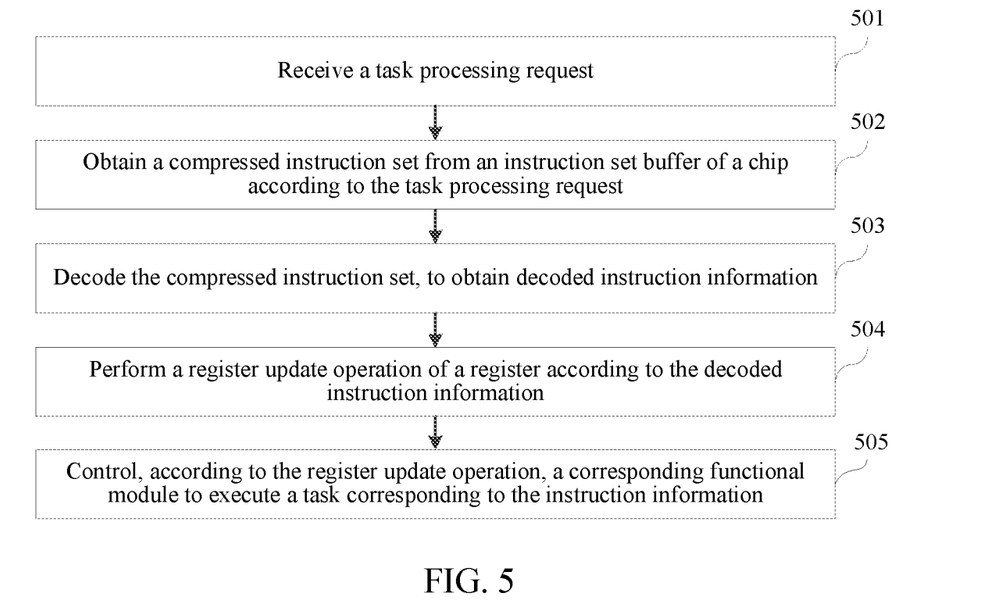
FIG. 5 is a flowchart of an instruction set processing method based on a chip architecture according to an exemplary embodiment of this application.

This embodiment of this application provides an instruction set processing method based on a chip architecture. Based on the embodiment shown in FIG. 2, the method is explained and described with regard to an instruction set processing method during task execution. As shown in FIG. 5, the method includes the following steps.

Step 501. Obtain a task processing request.

The deep learning model is formed by a plurality of layers, a kernel of each layer is formed by several relatively fixed calculation operators, and a main difference between various deep learning model architectures is how to arrange and combine the operators, for example, some deep learning models are basically formed by convolution calculation and an activation function. However, the chip implements basic operators, for example, how to complete the convolution calculation, matrix by matrix calculation, and the activation function. Therefore, after the deep learning model is mapped into the instruction set by using the method of the embodiment shown in FIG. 2, each instruction set may drive a corresponding functional module in the chip to execute a calculation task, and one calculation task may correspond to one task processing request.

A complete calculation process of the entire deep learning model may need a plurality of calculation tasks, and task processing requests corresponding to calculation tasks may form a task request queue. After a task is completed, a new task processing request is obtained from the task request queue.

Step 502. Obtain a compressed instruction set from an instruction set buffer of a chip according to the task processing request.

After the new task processing request is obtained, obtaining the compressed instruction set from the instruction set buffer of the chip is triggered.

If the task processing requests corresponding to the calculation tasks form the task request queue, after a task is completed, and a next new task processing request is obtained from the task request queue, the compressed instruction set is obtained from the instruction set buffer of the chip according to the new task processing request.

Step 503. Decode the compressed instruction set, to obtain decoded instruction information.

Because different instructions are distinguished by using different opcodes, when the compressed instruction set is decoded, the operand information in the instruction can be obtained according to the opcode, that is, the instruction information is obtained.

A common deep learning instruction set mainly includes four types of instruction information: computational, logical, control, and data transfer. In addition, each instruction has a corresponding Instruction Type field, and corresponding instruction content can be decoded according to a definition of the Instruction Type field, that is, corresponding instruction information is obtained.

Certainly, different instruction types may be further divided according to a subfield set by a compiler, and then decoding is performed according to the different instruction types, to obtain corresponding instruction information. The decoding method is not limited in this embodiment of this application.

Step 504. Perform a register update operation of a register according to the decoded instruction information.

With reference to the system architecture shown in FIG. 1, each functional module corresponds to an instruction register. When the process control and instruction decoding unit allocates new instruction information, the register is controlled to perform the register update operation, and the functional module is controlled to execute a corresponding task.

The register may be considered as a variable, and after a value is written, if no value is reassigned, the value of the register remains unchanged. The decoded instruction information includes the operand information, and different registers store different pieces of operand information. The performing a register update operation of a register according to the decoded instruction information includes: updating the operand information stored in a corresponding register according to the decoded instruction information, that is, updating the value of the register.

For example, for a variable channel_num representing a quantity of channels, a value of the variable channel_num is 512 in a previous calculation, that is, a value of the register is 512. In this calculation, the variable is 1024. Therefore, a value of the register is assigned to 1024 according to the instruction information, that is, a value of the register is reassigned to 1024. The process is the register update operation.

In the FPGA accelerator, instructions other than functional module starting instructions need to be registered, to support the foregoing instruction set compression method. By registering, each functional module stores the operand information in the instruction by using the register.

For example, a task is to perform a matrix multiplication operation. A length m and a width n of a matrix a as well as a length n and a width k of a matrix b are needed, and three pieces of operand information, namely, m, n, and k, are stored in different registers.

Before the functional module performs task starting a next time, if there is a new instruction having the same opcode, a corresponding register is updated. If not, a register stage of the related operand information is continuously retained.

Step 505. Control, according to the register update operation, a corresponding functional module to execute a task corresponding to the instruction information.

Different functional modules correspond to different registers. Therefore, after the instruction is registered, the process control and instruction decoding unit in the FPGA accelerator controls, by using the instruction information, execution of each functional module. The controlling, according to the register update operation, a corresponding functional module to execute a task corresponding to the instruction information includes: controlling the functional module corresponding to the register performing the register update operation, to perform a corresponding functional operation according to the stored operand information after the register update operation. For example, using the system architecture shown in FIG. 1 as an example, if the functional module corresponding to the register performing the register update operation is the accumulation unit 1082, the accumulation unit 1082 is controlled to perform a corresponding accumulation operation according to the stored operand information after the register update operation.

The process control and instruction decoding unit controls obtaining and execution of the instruction by determining status information of each functional module, thereby completing an acceleration task of a complete model. Optionally, the status information of the functional module may be used for reflecting an execution state of the functional module, for example, whether the task is executed. If not, the obtaining and the execution of the instruction may be continuously controlled. In addition, a basic interface between each functional module and the process control and instruction decoding unit of the chip accelerator includes fetch_inst: executing an instruction command; exe_busy: instruction execution in progress; and inst_done: instruction execution completed. The process control is implemented through the foregoing interfaces.

Granularity of each instruction set may drive an independent functional module to complete an independent calculation task. For example, for a pooling operation, if the pooling operation needs to be performed on a specific layer of data in a model, data points do not need to be driven by using instructions one by one to perform calculation. Only parameter information of the pooling calculation needs to be decoded into the register of a pooling interface in a form of an instruction, so that an entire operation may be completed. An intermediate calculation control process is completed by internal logic of the pooling functional module.

The same as the pooling calculation principle, the matrix calculation, the convolution calculation, and the like are correspondingly performed in the same way. Coarse-grained instruction set design may be selected according to a designed processing capability of each functional module in the chip, to greatly reduce a quantity of instruction sets after model mapping.

Figure 6:
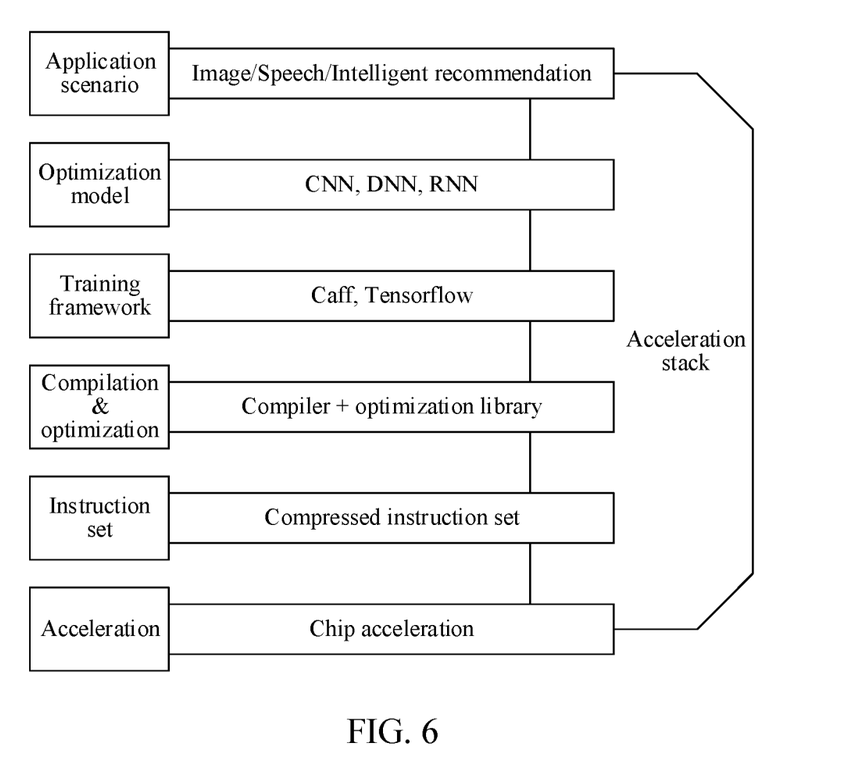
FIG. 6 is a schematic diagram of a processing procedure of a deep learning instruction set according to an exemplary embodiment of this application.

Based on foregoing introduction to the instruction set processing method, an acceleration stack for processing the instruction set may be shown in FIG. 6. During execution of a task, the instruction set processing procedure control process may be shown in FIG. 7.

Figure 7:
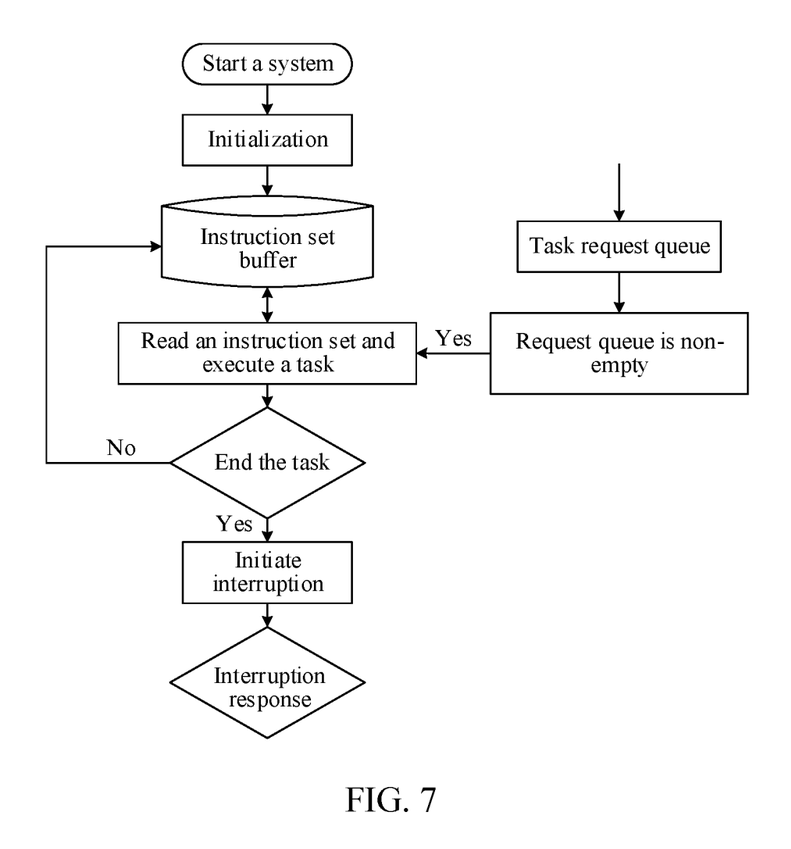
FIG. 7 is a diagram of process control in a processing procedure of a deep learning instruction set according to an exemplary embodiment of this application.

For example, after the system is started, through the foregoing analysis on data dependency and parallel relationships in the calculation process, a complete deep learning model is split, according to parameter information of each layer of the deep learning model, into smaller computation elements that may be supported by the chip. A to-be-accelerated deep learning model is compiled according to the foregoing analysis and splitting processes, to obtain a to-be-processed deep learning instruction set. After the deep learning instruction set is compressed, an initialization process from the model to the instruction set is completed. The compressed instruction set is buffered into the instruction set buffer by writing in a register. When there is a task, the compressed instruction set is obtained from the instruction set buffer of the chip according to the task processing request, is then sent to the process control and instruction decoding unit of the chip, and is decoded by the process control and instruction decoding unit, to obtain the instruction information. Next, the instruction information of the instruction set may be read, and the task is executed. When the task is executed, the register is controlled to perform the register update operation, and then the functional module is controlled to perform a corresponding operation, thereby completing processing the task. If the task is not ended, the instruction set is continuously read from the instruction set buffer, and the task is executed until the task is ended, and an interruption is initiated. After the interruption is completed, an interruption response is returned.

In the instruction set processing procedure control process, the functional modules do not need to be driven one by one for the instructions as in the related art, but execution of a class or a set of instructions is implemented by directly using the instruction information. For example, all instructions of an entire operation of a task are decoded to obtain instruction information, execution of the entire task is implemented simply by using the instruction information. The execution process is internally implemented by the functional module according to the instruction information, thus completing the operation once. Accordingly, retrievals and accesses of instructions are reduced.

According to the method provided in this embodiment of this application, the compressed instruction set is obtained from the instruction set buffer of the chip according to the task processing request, and after the compressed instruction set is decoded to obtain the instruction information, the register update operation of the register is performed according to the decoded instruction information to implement registering of the instruction. Therefore, the task is executed by using the instruction information, a quantity of instruction retrievals and accesses can be reduced, and retrievals and accesses overheads are reduced.

The instruction set processing method based on a chip architecture as shown in FIG. 2 to FIG. 5 may be applied to a terminal or a server, or may be further applied to a cloud. For example, the method may be applied to scenarios such as a smart city, an unmanned aerial vehicle, and an unmanned vehicle, or may be applied to a cloud computing scenario. The application scenario of the foregoing method is not limited in this application.

Figure 8:
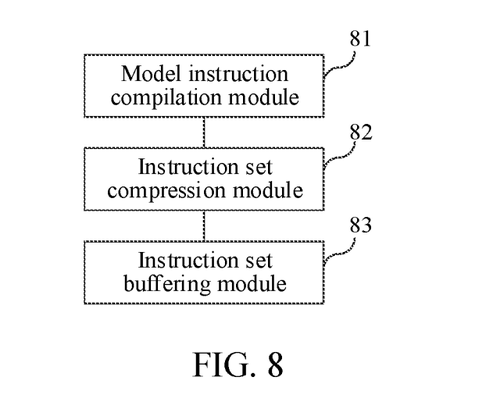
FIG. 8 is a schematic structural diagram of an instruction set processing apparatus according to an exemplary embodiment of this application.

This embodiment of this application provides the instruction set processing apparatus based on an architecture of a chip, configured to perform the foregoing method shown in FIG. 2. As shown in FIG. 8, the instruction set processing apparatus provided in this embodiment of this application includes: a model instruction compilation module 81, configured to compile a to-be-accelerated deep learning model based on an architecture of a chip, to obtain a to-be-processed deep learning instruction set matching the chip; an instruction set compression module 82, configured to compress the to-be-processed deep learning instruction set, to obtain a compressed instruction set; and an instruction set buffering module 83, configured to store the compressed instruction set into an instruction set buffer of the chip by writing in a register, to execute a corresponding task.

In one embodiment, the model instruction compilation module 81 is configured to select a matched deep learning model according to an application scenario, and train the selected deep learning model to obtain the to-be-accelerated deep learning model; and perform structural analysis on the to-be-accelerated deep learning model based on the architecture of the chip, and compiling the to-be-accelerated deep learning model according to an analysis result, to obtain the to-be-processed deep learning instruction set matching the chip.

In one embodiment, the model instruction compilation module 81 is configured to perform, based on the architecture of the chip, at least one type of dependency analysis, model structure optimization analysis, and variable-precision fixed-point analysis on the to-be-accelerated deep learning model.

In one embodiment, the model instruction compilation module 81 is configured to analyze and explore streamlined calculation and parallelizable calculation in the to-be-accelerated deep learning model based on the architecture of the chip.

Each instruction in the to-be-processed deep learning instruction set includes an opcode and operand information.

In one embodiment, the instruction set compression module 82 is configured to compress instructions having the same opcode in the to-be-processed deep learning instruction set, to obtain the compressed instruction set.

In one embodiment, the instruction set compression module 82 is configured to obtain a bit width of each instruction in the to-be-processed deep learning instruction set and combine instructions having bit widths less than a preset value, to obtain the compressed instruction set.

According to the apparatus provided in this embodiment of this application, the to-be-processed deep learning instruction set is compressed, and demands for storage space can be reduced. The compressed instruction set is stored in the instruction set buffer of the chip by writing in a register, and the instruction is registered, thereby reducing a quantity of instruction retrievals and accesses and reducing overheads of the retrievals and accesses during task execution.

Figure 9:
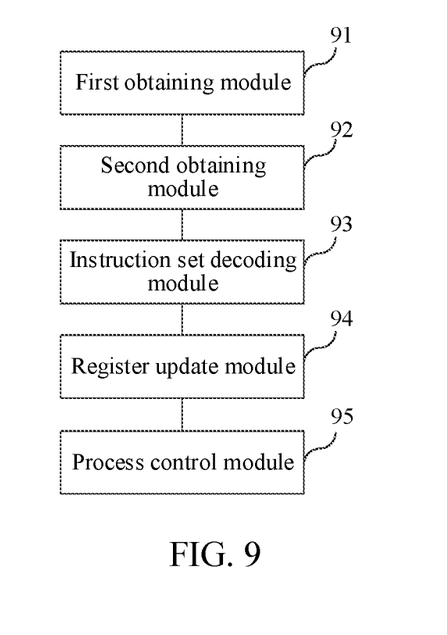
FIG. 9 is a schematic structural diagram of an instruction set processing apparatus according to an exemplary embodiment of this application.

This embodiment of this application provides the instruction set processing apparatus, configured to perform the foregoing method shown in FIG. 5. As shown in FIG. 9, the apparatus provided in this embodiment of this application includes: a first obtaining module 901, configured to obtain a task processing request; a second obtaining module 902, configured to obtain a compressed instruction set from an instruction set buffer according to the task processing request; an instruction set decoding module 903, configured to decode the compressed instruction set, to obtain decoded instruction information; a register update module 904, configured to perform a register update operation of a register according to the decoded instruction information; and a process control module 905, configured to control, according to the register update operation, a corresponding functional module to execute a task corresponding to the instruction information.

In one embodiment, the decoded instruction information includes operand information, and different registers store different pieces of operand information.

The register update module 904 is configured to update, according to the decoded instruction information, the operand information stored in the corresponding register.

In one example, different functional modules correspond to different registers. The process control module 905 is configured to control the functional module corresponding to the register performing the register update operation to perform a corresponding functional operation according to the stored operand information after the register update operation.

According to the apparatus provided in this embodiment of this application, the compressed instruction set is obtained from the instruction set buffer of the chip according to the task processing request, and after the compressed instruction set is decoded to obtain the instruction information, the register update operation of the register is performed according to the decoded instruction information to implement registering of the instruction. Therefore, the task is executed by using the instruction information, a quantity of instruction retrievals and accesses can be reduced, and retrievals and accesses overheads are reduced.

According to the instruction set processing apparatus provided by the foregoing embodiments, the above functional modules are only described for exemplary purposes. In some embodiments, the functions may be allocated to different functional modules according to specific requirements for implementation, that is, the internal structure of the apparatus is divided into different functional modules to implement all or some of the above described functions. In addition, the instruction set processing apparatus provided in the foregoing embodiment belongs to the same idea as the instruction set processing method based on a chip architecture. Reference may be made to method embodiments for a specific implementation process thereof, and the details are not described herein again.

Moreover, the apparatuses shown in FIG. 8 and FIG. 9 may be further combined into an apparatus. That is, the deep learning instruction set processing apparatus provided in this embodiment of this application may include modules shown in FIG. 8, and further include modules shown in FIG. 9.

Figure 10:
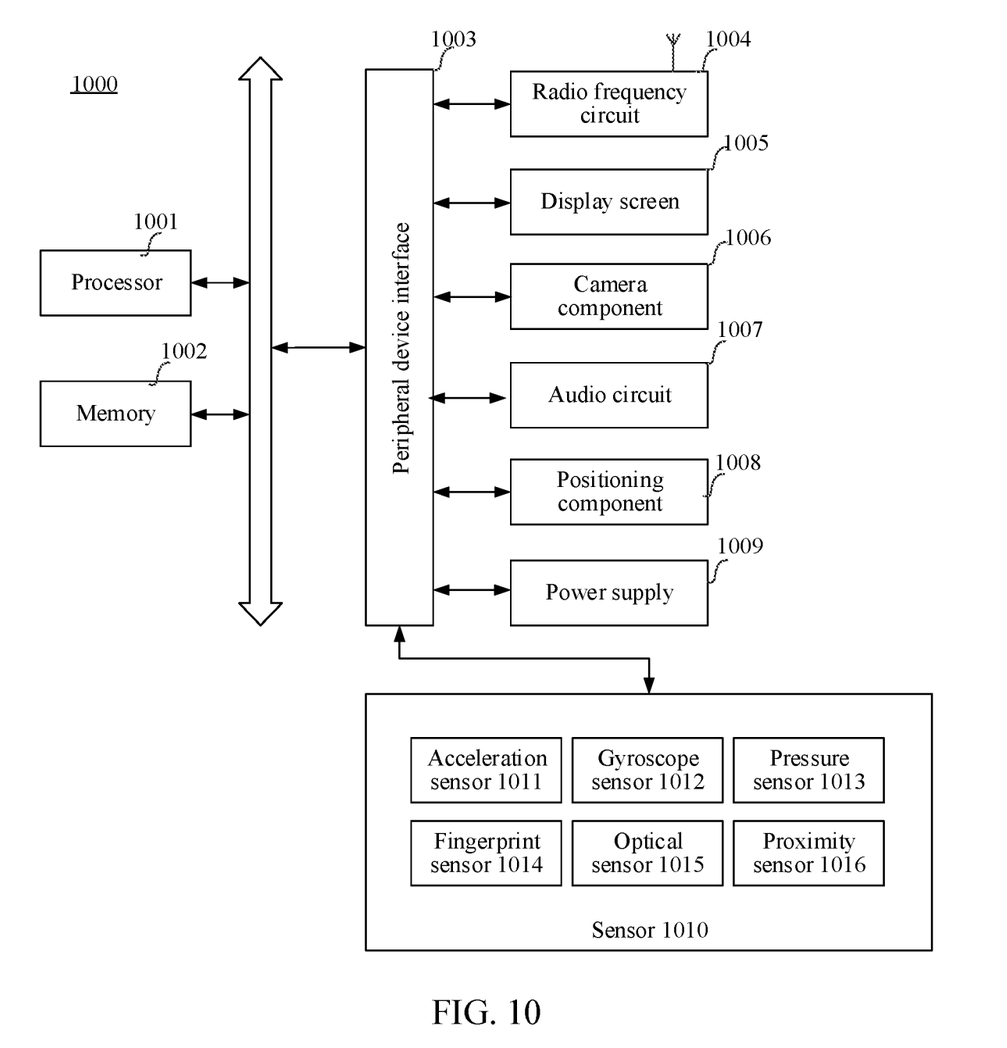
FIG. 10 is a schematic structural diagram of a terminal according to according to an exemplary embodiment of this application.

FIG. 10 shows a structural block diagram of a terminal 1000 according to an exemplary embodiment of this application. The terminal 1000 may be a smartphone, a tablet computer, a moving picture experts group audio layer III (MP3) player, a moving picture experts group audio layer IV (MP4) player, a notebook computer, or a desktop computer. The terminal 1000 may also be referred to as another name such as user equipment, a portable terminal, a laptop terminal, or a desktop terminal.

Generally, the terminal 1000 includes a processor 1001 and a memory 1002.

The processor 1001 includes one or more processing cores, for example, a 4-core processor or an 8-core processor. The processor 1001 may be implemented by at least one hardware form of a digital signal processor (DSP), a field-programmable gate array (FPGA), and a programmable logic array (PLA). The processor 1001 may alternatively include a main processor and a coprocessor. The main processor is configured to process data in an awake state, also referred to as a central processing unit (CPU), and the coprocessor is a low-power processor configured to process data in an idle state. In some embodiments, the processor 1001 may be integrated with a graphics processing unit (GPU). The GPU is responsible for rendering and drawing content to be displayed by a display screen. In some embodiments, the processor 1001 may further include an artificial intelligence (AI) processor. The AI processor is configured to process a calculation operation related to machine learning.

The memory 1002 may include one or more computer-readable storage media. The computer-readable storage media may be non-transient. The memory 1002 may further include a high-speed random access memory, and a non-volatile memory such as one or more magnetic disk storage devices and a flash memory device. In some embodiments, the non-transient computer-readable storage medium in the memory 1002 is configured to store at least one instruction. The at least one instruction is executed by the processor 1001 to perform the instruction set processing method based on a chip architecture provided in the method embodiment in this application.

In some embodiments, the terminal 1000 may further include a peripheral device interface 1003 and at least one peripheral device. The processor 1001, the memory 1002, and the peripheral device interface 1003 may be connected through a bus or a signal cable. Each peripheral device may be connected to the peripheral device interface 1003 through a bus, a signal cable, or a circuit board. Specifically, the peripheral device includes: at least one of a radio frequency circuit 1004, a display screen 1005, a camera component 1006, an audio circuit 1007, a positioning component 1008, and a power supply 1009.

The peripheral device interface 1003 may be configured to connect at least one peripheral device related to input/output (I/O) to the processor 1001 and the memory 1002. In some embodiments, the processor 1001, the memory 1002, and the peripheral device interface 1003 are integrated into the same chip or circuit board. In some other embodiments, any one or two of the processors 1001, the memory 1002, and the peripheral device interface 1003 may be implemented on an independent chip or circuit board, and the implementation is not limited in this embodiment.

The radio frequency circuit 1004 is configured to receive and transmit a radio frequency (RF) signal, also referred to as an electromagnetic signal. The radio frequency circuit 1004 communicates with a communications network and another communications device by using the electromagnetic signal. The radio frequency circuit 1004 may convert an electric signal into an electromagnetic signal for transmission, or convert a received electromagnetic signal into an electric signal. In some embodiments, the radio frequency circuit 1004 includes an antenna system, an RF transceiver, one or more amplifiers, a tuner, an oscillator, a digital signal processor, a codec chip set, a subscriber identity module card, and the like. The radio frequency circuit 1004 may communicate with another terminal by using a wireless communication protocol. The wireless communication protocol includes, but is not limited to, the World Wide Web, a metropolitan area network, an intranet, generations of mobile communications networks (2G, 3G, 4G, and 5G), a wireless local area network, and/or a wireless fidelity (Wi-Fi) network. In some embodiments, the radio frequency circuit 1004 may further include a near field communication (NFC) related circuit, and is not limited in this application.

The display screen 1005 is configured to display a user interface (UI). The UI may include a graph, text, an icon, a video, and any combination thereof. When the display screen 1005 is a touch screen, the display screen 1005 is further capable of collecting a touch signal on or over a surface of the display screen 1005. The touch signal may be inputted into the processor 1001 as a control signal for processing. In this case, the display screen 1005 may be further configured to provide a virtual button and/or a virtual keyboard, also referred to as a soft button and/or a soft keyboard. In some embodiments, there is one display screen 1005, disposed on a front panel of the terminal 1000. In some other embodiments, there may be two display screens 1005, respectively disposed on different surfaces of the terminal 1000 or designed in a foldable shape. In still some other embodiments, the display screen 1005 may be a flexible display screen, disposed on a curved surface or a folded surface of the terminal 1000. Even, the display screen 1005 may be further set to have a non-rectangular irregular graph, that is, a special-shaped screen. The display screen 1005 may be manufactured by using a material such as a liquid crystal display (LCD), an organic light-emitting diode (OLED), or the like.

The camera component 1006 is configured to collect an image or a video. In some embodiments, the camera component 1006 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1006 may further includes a flash. The flash may be a single color temperature flash or a double color temperature flash. The double color temperature flash refers to a combination of a warm flash and a cold flash, and may be configured to perform light ray compensation at different color temperatures.

The audio circuit 1007 may include a microphone and a loudspeaker. The loudspeaker is configured to collect sound waves of a user and an environment, and convert the sound waves into electric signals and input the electrical signals into the processor 1001 for processing, or input the electrical signals into the radio frequency circuit 1004 to implement speech communication. For the purpose of stereo sound collection or noise reduction, there may be a plurality of microphones, respectively disposed at different parts of the terminal 1000. The microphone may be further a microphone array or an omnidirectional collection microphone. The loudspeaker is configured to convert electric signals from the processor 1001 or the radio frequency circuit 1004 into sound waves. The loudspeaker may be a conventional thin-film loudspeaker or a piezoelectric ceramic loudspeaker. When the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 1007 may further include an earphone jack.

The positioning component 1008 is configured to position a current geographic location of the terminal 1000, to implement a navigation or a location based service (LBS). The positioning component 1008 may be a positioning component based on the global positioning system (GPS) of the United States, the Beidou system of China, or the Galileo system of Russia.

The power supply 1009 is configured to supply power to components in the terminal 1000. The power supply 1009 may be an alternating current, a direct current, a primary battery, or a rechargeable battery. When the power supply 1009 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 1000 further includes one or more sensors 1010. The one or more sensors 1010 include, but are not limited to, an acceleration sensor 1011, a gyroscope sensor 1012, a pressure sensor 1013, a fingerprint sensor 1014, an optical sensor 1015, and a proximity sensor 1016.

The acceleration sensor 1011 may detect acceleration on three coordinate axes of a coordinate system established by the terminal 1000. For example, the acceleration sensor 1011 may be configured to detect components of gravity acceleration on the three coordinate axes. The processor 1001 may control, according to a gravity acceleration signal collected by the acceleration sensor 1011, the display screen 1005 to display the user interface in a frame view or a portrait view. The acceleration sensor 1011 may be further configured to collect motion data of a game or a user.

The gyroscope sensor 1012 may detect a body direction and a rotation angle of the terminal 1000, and may collect a 3D action of the user on the terminal 1000 together with the acceleration sensor 1011. The processor 1001 may implement the following functions according to data collected by the gyroscope sensor 1012: motion sensing (for example, the UI is changed according to a tilt operation of the user), image stabilization during shooting, game control, and inertial navigation.

The pressure sensor 1013 may be disposed on a side frame of the terminal 1000 and/or a lower layer of the display screen 1005. When the pressure sensor 1013 is disposed on the side frame of the terminal 1000, a holding signal of the user on the terminal 1000 may be detected. The processor 1001 performs left and right hand recognition or a quick operation according to the holding signal collected by the pressure sensor 1013. When the pressure sensor 1013 is disposed on the low layer of the display screen 1005, the processor 1001 controls, according to a pressure operation of the user on the display screen 1005, an operable control on the UI. The operable control includes at least one of a button control, a scroll bar control, an icon control, and a menu control.

The fingerprint sensor 1014 is configured to collect a fingerprint of the user. The processor 1001 identifies an identity of the user according to the fingerprint collected by the fingerprint sensor 1014, or the fingerprint sensor 1014 identifies an identity of the user according to the collected fingerprint. When the identity of the user is identified as a trusted identity, the processor 1001 authorizes the user to perform a related sensitive operation. The sensitive operation includes unlocking a screen, viewing encrypted information, downloading software, payment, changing configurations, and the like. The fingerprint sensor 1014 may be disposed on a front face, a back face, or a side face of the terminal 1000. When a physical button or a vendor logo is disposed on the terminal 1000, the fingerprint 1014 may be integrated with the physical button or the vendor logo.

The optical sensor 1015 is configured to collect ambient light intensity. In an embodiment, the processor 1001 may control display luminance of the display screen 1005 according to the ambient light intensity collected by the optical sensor 1015. Specifically, when the ambient light intensity is relatively high, the display luminance of the display screen 1005 is increased. When the ambient light intensity is relatively low, the display luminance of the display screen 1005 is reduced. In another embodiment, the processor 1001 may further dynamically adjust shooting parameters of the camera component 1006 according to the ambient light intensity collected by the optical sensor 1015.

The proximity sensor 1016, also referred to as a distance sensor, is usually disposed on the front panel of the terminal 1000. The proximity sensor 1016 is configured to collect a distance between a front face of the user and the front face of the terminal 1000. In an embodiment, when the proximity sensor 1016 detects that the distance between the front face of the user and the front face of the terminal 1000 is gradually decreased, the processor 1001 controls the display screen 1005 to switch from a screen-on state to a screen-off state. When the proximity sensor 1016 detects that the distance between the front face of the user and the front face of the terminal 1000 is gradually increased, the processor 1001 controls the display screen 1005 to switch from the screen-off state to the screen-on state.

Figure 11:
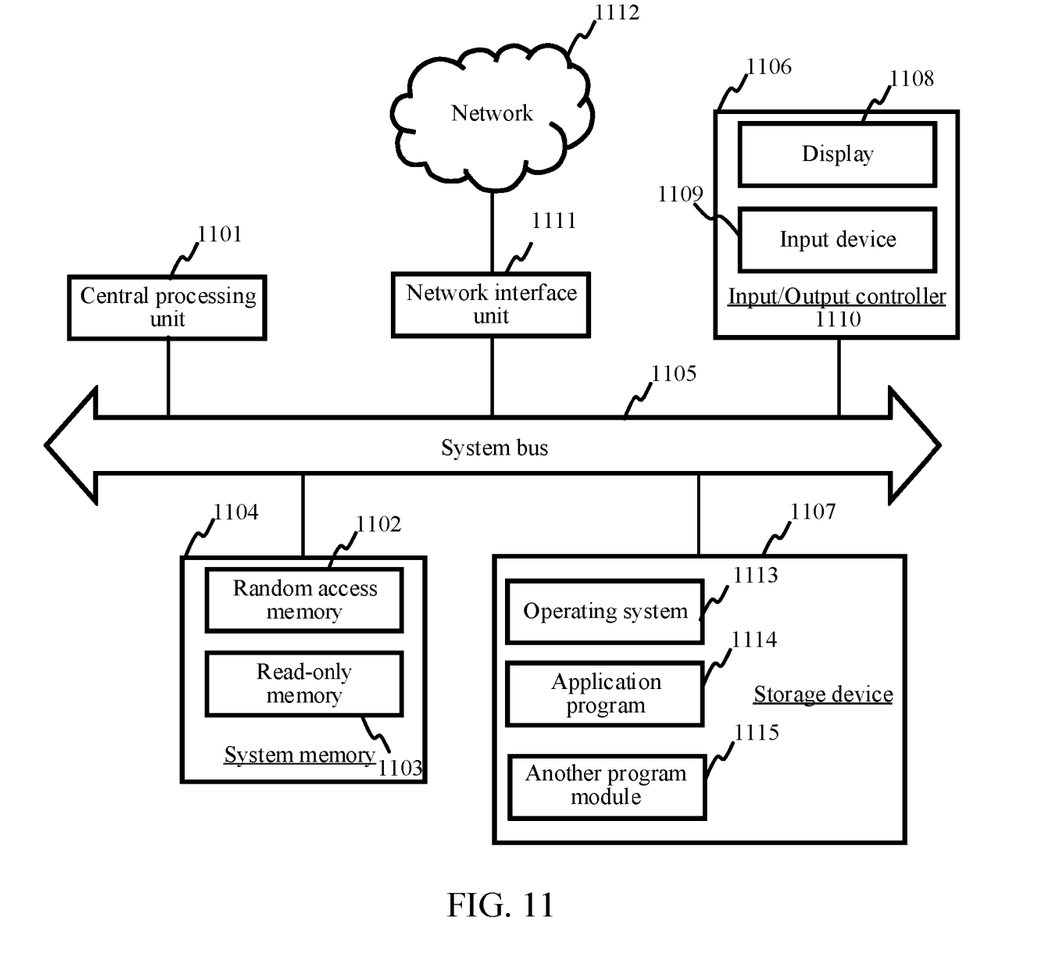
FIG. 11 is a schematic structural diagram of a server according to an exemplary embodiment of this application.

A person skilled in the art may understand that the structure shown in FIG. 10 does not constitute a limitation to the terminal 1000, and the terminal may include more components or fewer components than those shown in the figure, or some components may be combined, or a different component deployment may be used FIG. 11 is a schematic structural diagram of a server according to an exemplary embodiment. The server 1100 includes a central processing unit (CPU) 1101, a system memory 1104 including a random access memory (RAM) 1102 and a read-only memory (ROM) 1103, and a system bus 1105 connecting the system memory 1104 and the CPU 1101. The server 1100 further includes a basic input/output system (I/O system) 1106 for transmitting information between components in a computer, and a storage device 1107 configured to store an operating system 1113, an application program 1114, and another program module 1115.

The basic input/output system 1106 includes a display 1108 configured to display information and an input device 1109 such as a mouse or a keyboard that is configured for information inputting by a user. The display 1108 and the input device 1109 are both connected to the central processing unit 1101 by using an input and output controller 1110 connected to the system bus 1105. The basic input/output system 1106 may further include the input and output controller 1110, for receiving and processing an input from a plurality of other devices such as a keyboard, a mouse, or an electronic stylus. Similarly, the input/output controller 1110 further provides an output to a display screen, a printer, or another type of output device.

The storage device 1107 is connected to the central processing unit 1101 by using a mass storage controller (not shown) connected to the system bus 1105. The storage device 1107 and an associated computer-readable medium provide non-volatile storage for the server 1100. That is, the large-capacity storage device 1107 may include a computer-readable medium (not shown) such as a hard disk drive or a CD-ROM driver.

In general, the computer-readable medium may include a computer storage medium and a communications medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memories 1104 and the storage device 1107 may be collectively referred to as memories.

According to various embodiments of this application, the server 1100 may further be connected, by using a network such as the Internet, to a remote computer on the network and run. That is, the server 1100 may be connected to a network 1112 by using a network interface unit 1111 connected to the system bus 1105, or may be connected to another type of network or remote computer system (not shown) by using the network interface unit 1111.

The memory further includes one or more programs. The one or more programs are stored in the memory. The CPU 1101 executes the one or more programs to implement the instruction set processing method based on a chip architecture shown provided in the embodiments of this application.

In an exemplary embodiment, a non-temporary computer-readable storage medium including an instruction is further provided. For example, the non-temporary computer-readable storage medium includes at least one instruction, at least one program, a code set, or an instruction set. The at least one instruction, the at least one program, the code set, or the instruction set may be executed by a processor to implement all or some steps in the embodiments of this application. For example, the non-temporary computer-readable storage medium may be a ROM, a random access memory (RAM), a CD-ROM, a magnetic tape, a floppy disk, an optical data storage device, or the like.

The foregoing descriptions are merely optional embodiments of this application, but are not intended to limit this application. Any modification, equivalent replacement, or improvement made without departing from the spirit and principle of this application is to fall within the protection scope of this application.

What is claimed is:

1. An instruction set processing method, applied to a terminal or a server, the method comprising:
   compiling a deep learning model to obtain a deep learning instruction set corresponding to a chip;
   compressing the deep learning instruction set to obtain a compressed instruction set, wherein the compressing includes:
      identifying in the deep learning instruction set a first instruction and a second instruction both having a same operation code, and removing one of the first or the second instruction from the deep learning instruction set to obtain the compressed instruction set; and
      obtaining a bit width of each instruction in the deep learning instruction set, and combining instructions having bit widths less than a preset value to obtain the compressed instruction set, wherein the instructions include a first instruction of a first bit width smaller than the preset value and a second instruction of a second bit width also smaller than the preset value but different than the first bit width;
   storing the compressed instruction set in an instruction set buffer of the chip
   obtaining instruction information from the compressed instruction set as stored; and
   performing process control on a model accelerator of the chip according to the instruction information, wherein the model accelerator includes a one-to-one correspondence between registers and functional modules, and wherein the functional modules include two or more of a computation element, an accumulation unit, an activation unit, a normalization and pooling unit, or an internal memory access unit.

2. The method according to claim 1, wherein the compiling the deep learning model to obtain the deep learning instruction set corresponding to the chip comprises:
   selecting the deep learning model according to an application scenario;
   training the deep learning model;
   performing structural analysis on the deep learning model; and
   compiling the deep learning model according to an analysis result to obtain the deep learning instruction set corresponding to the chip.

3. The method according to claim 2, wherein the performing structural analysis on the deep learning model comprises:
   performing at least one of a dependency analysis, a model structure optimization analysis, or a variable-precision fixed-point analysis on the deep learning model.

4. The method according to claim 3, wherein the performing at least one of the dependency analysis, the model structure optimization analysis, or the variable-precision fixed-point analysis on the deep learning model comprises:
   analyzing and exploring streamlined calculation and parallelizable calculation in the deep learning model.

5. An instruction set processing apparatus, comprising: a memory; and a processor coupled to the memory and configured to:
   compile a deep learning model to obtain a deep learning instruction set corresponding to a chip;
   compress the deep learning instruction set to obtain a compressed instruction set wherein the compressing includes:
      identifying in the deep learning instruction set a first instruction and a second instruction both having a same operation code, and removing one of the first or the second instruction from the deep learning instruction set to obtain the compressed instruction set; and
      obtaining a bit width of each instruction in the deep learning instruction set, and combining instructions having bit widths less than a preset value to obtain the compressed instruction set, wherein the instructions include a first instruction of a first bit width smaller than the preset value and a second instruction of a second bit width also smaller than the preset value but different than the first bit width;
   store the compressed instruction set into an instruction set buffer of the chip
   obtain instruction information from the compressed instruction set as stored; and
   perform process control on a model accelerator of the chip according to the instruction information, wherein the model accelerator includes a one-to-one correspondence between registers and functional modules, and wherein the functional modules include two or more of a computation element, an accumulation unit, an activation unit, a normalization and pooling unit, or an internal memory access unit.

6. The apparatus according to claim 5, wherein the processor is further configured to select the deep learning model according to an application scenario, and train the deep learning model as selected.

7. The apparatus according to claim 5, wherein the processor is further configured to perform structural analysis on the deep learning model, and compile the deep learning model according to an analysis result, to obtain the deep learning instruction set corresponding to the chip.

8. The apparatus according to claim 7, wherein the processor is further configured to perform at least one type of dependency analysis, model structure optimization analysis, or variable-precision fixed-point analysis on the deep learning model.

9. The apparatus according to claim 8, wherein the processor is further configured to analyze and explore streamlined calculation and parallelizable calculation in the deep learning model.

10. A non-transitory computer readable storage medium storing computer instructions that, upon being executed by a processor, causing the processor to perform:
   compiling a deep learning model to obtain a deep learning instruction set corresponding to a chip;
   compressing the deep learning instruction set to obtain a compressed instruction set wherein the compressing includes:
      identifying in the deep learning instruction set a first instruction and a second instruction both having a same operation code, and removing one of the first or the second instruction from the deep learning instruction set to obtain the compressed instruction set; and
      obtaining a bit width of each instruction in the deep learning instruction set, and combining instructions having bit widths less than a preset value to obtain the compressed instruction set, wherein the instructions include a first instruction of a first bit width smaller than the preset value and a second instruction of a second bit width also smaller than the preset value but different than the first bit width;

storing the compressed instruction set in an instruction set buffer of the chip obtaining instruction information from the compressed instruction set as stored; and performing process control on a model accelerator of the chip according to the instruction information, wherein the model accelerator includes a one-to-one correspondence between registers and functional modules, and wherein the functional modules include two or more of a computation element, an accumulation unit, an activation unit, a normalization and pooling unit, or an internal memory access unit.

11. The storage medium according to claim 10, wherein the compiling the learning model to obtain the deep learning instruction set corresponding to the chip comprises:

performing structural analysis on the deep learning model; and compiling the deep learning model according to an analysis result to obtain the deep learning instruction set corresponding to the chip.

12. The storage medium according to claim 10, wherein the computer instructions further cause the processor to perform:

selecting the deep learning model according to an application scenario; and training the deep learning model as selected.

13. The storage medium according to claim 10, wherein the performing structural analysis on the deep learning model comprises:

performing at least one of a dependency analysis, a model structure optimization analysis, or a variable-precision fixed-point analysis on the deep learning model.

14. The storage medium according to claim 13, wherein the performing, based on the architecture of the chip, at least one of the dependency analysis, the model structure optimization analysis, or the variable-precision fixed-point analysis on the deep learning model comprises:

analyzing and exploring streamlined calculation and parallelizable calculation in the deep learning model.

15. The method according to claim 1, wherein the instruction set buffer includes an input buffer and an output buffer, the method further comprising:

inputting a data processing request to the input buffer;

processing the data processing request via the functional modules to obtain a processed data processing request; and outputting the processed data processing request to the output buffer.

16. The method according to claim 15, wherein the input buffer includes an input buffer ping and an input buffer pong, the method further comprising:

having the input buffer ping in communication with the input buffer pong;

having the functional modules in communication with the input buffer ping; and having the functional modules in communication with the input buffer pong.

17. The apparatus according to claim 5, wherein the instruction set buffer includes an input buffer and an output buffer, and wherein the processor is further positioned to:

input a data processing request to the input buffer;

process the data processing request via the functional modules to obtain a processed data processing request; and output the processed data processing request to the output buffer.

18. The apparatus according to claim 17, wherein the input buffer includes an input buffer ping and an input buffer pong, and wherein the processor is further positioned to:

have the input buffer ping in communication with the input buffer pong;

have the functional modules in communication with the input buffer ping; and have the functional modules in communication with the input buffer pong.

19. The non-transitory computer readable storage medium according to claim 10, wherein the instruction set buffer includes an input buffer and an output buffer, and wherein the computer instructions cause the processor to further perform:

inputting a data processing request to the input buffer;

processing the data processing request via the functional modules to obtain a processed data processing request; and outputting the processed data processing request to the output buffer.

20. The non-transitory computer readable storage medium according to claim 19, wherein the input buffer includes an input buffer ping and an input buffer pong, and wherein the computer instructions cause the processor to further perform:

having the input buffer ping in communication with the input buffer pong;

having the functional modules in communication with the input buffer ping; and having the functional modules in communication with the input buffer pong.

* * * * *